United States Patent [19]

Cachon

[11] 3,769,794

[45] Nov. 6, 1973

[54] MANIPULATION APPARATUS

[75] Inventor: Rene P. Cachon, Wappingers Falls, N.Y.

[73] Assignee: International Business Machines Corporation, Armonk, N.Y.

[22] Filed: Mar. 31, 1970

[21] Appl. No.: 24,258

[52] U.S. Cl. .......................... 60/594, 92/6, 92/65

[51] Int. Cl. ....... F15b 7/00, F01b 31/00, F01b 7/10

[58] Field of Search .................... 60/54.5 R, 54.6 R, 60/54.6 A; 92/6, 65; 33/163, 165; 251/266

[56] References Cited

UNITED STATES PATENTS

| | | | |
|---|---|---|---|
| 3,057,163 | 10/1962 | Alping | 92/52 |
| 1,754,138 | 4/1930 | Agee | 251/266 |
| 3,553,967 | 1/1971 | Porter et al. | 60/54.5 R |
| 3,173,263 | 3/1965 | Porter | 60/54.5 |
| 2,374,672 | 5/1945 | Farris | 60/54.6 R |
| 1,263,401 | 4/1918 | Fraser | 92/6 R |
| 2,106,304 | 1/1938 | McGee | 60/54.6 R |
| 3,460,346 | 8/1969 | Branson | 60/54.5 R |
| 2,042,897 | 6/1936 | Horton et al. | 60/62.5 |
| 3,307,356 | 3/1967 | Harrison | 60/54.5 R |
| 3,475,911 | 11/1969 | Harrison | 60/54.5 R |

*Primary Examiner*—Martin P. Schwadron
*Assistant Examiner*—A. M. Zupic
*Attorney*—Hanifin & Jancin and William J. Dick

[57] ABSTRACT

This patent discloses apparatus for effecting changes in the position of a workpiece, the apparatus comprising a transmitter or control unit which is coupled to a remotely positioned manipulator or receiver. Each of the transmitter and receiver includes a chamber, the chamber of the transmitter being connected to the chamber of the receiver by tubing and the like. In the chamber of the transmitter is means to effect large volumetric changes in the volume of the chamber and separate means to effect small changes in the volume of the chamber, in the disclosed illustration a pair of concentrically disposed pistons. In the chamber of the receiver is another piston which is coupled to output means such as a shaft so that, upon filling the chambers associated with the transmitter and receiver with a liquid, both large and small volumetric changes in the transmitter chamber effected by one or both of the pistons in the chamber causes a change in the volume in the receiver chamber, thereby causing displacement of the piston in the receiver and thus changing the position of the output of the shaft.

12 Claims, 5 Drawing Figures

INVENTOR
RENE P. CACHON
BY William J. Dick
ATTORNEY

MANIPULATION APPARATUS

SUMMARY OF THE INVENTION AND STATE OF PRIOR ART

The present invention relates to apparatus for effecting changes in the position of workpieces, and more specifically relates to hydraulically coupled apparatus which permits of both coarse and fine adjustment of an output from a remote (if desired) position.

In the production of integrated circuits on a semiconductor wafer, it is necessary to apply a photo resist to the surface of the wafer and thereafter expose the photo resist to light through a geometrically patterned mask thereby placing a preset pattern in the photo resist. After the photo resist has been exposed to the pattern, it is developed and etching and diffusion takes place in subsequent steps. Additionally, further coating of the wafer for future pattern exposure and subsequent re-etching and diffusion is conventionally necessary in order to produce a final product. As may be readily ascertained from the foregoing, it is necessary to align the mask and wafer in precise superimposed overlapping relation to insure proper alignment for exposure of patterns in the photo resist. As the number of passive and active devices, per integrated circuit chip, increases, and as line interconnection width decreases, the criticality of accurate alignment in both X, Y and $\theta$ coordinates becomes extremely difficult to obtain. Conventional micrometer adjustment is subject to wear in the fine threads of the micrometer which increases, of course, with age and use. Additionally, very fine adjustment is critical and difficult to attain unless a large step-down gear ratio is used. This, of course, leads to additional backlash and wear problems. Additionally, it is desirable to quickly bring the mask and wafer into their approximately correct alignment position, and then make a fine correction which is relatively insensitive to thereby bring the mask and wafer into exact alignment.

In view of the above, it is a principal object of the present invention to provide apparatus which allows for changes in workpiece positioning without a direct mechanical connection between the input and output apparatus.

Another object of the present invention is to provide apparatus which allows for coarse changes in workpiece positioning as well as very fine changes in workpiece positioning.

Yet another object of the present invention is to provide apparatus which permits control of workpiece position from a remote location if desired, while permitting an accuracy of alignment difficult to obtain without bulky conventional gear arrangements.

Still another object of the present invention is to provide apparatus having a receiver and remotely located transmitter in which the receiver is hydraulically coupled to the transmitter.

Still another object of the present invention is to provide a transmitter having a single control which allows the operator to make both a fine and coarse adjustment of a workpiece with that single control.

Other objects and a fuller understanding of the invention may be had by referring to the following specification and claims taken in conjunction with the accompanying drawings in which:

Figure 1:
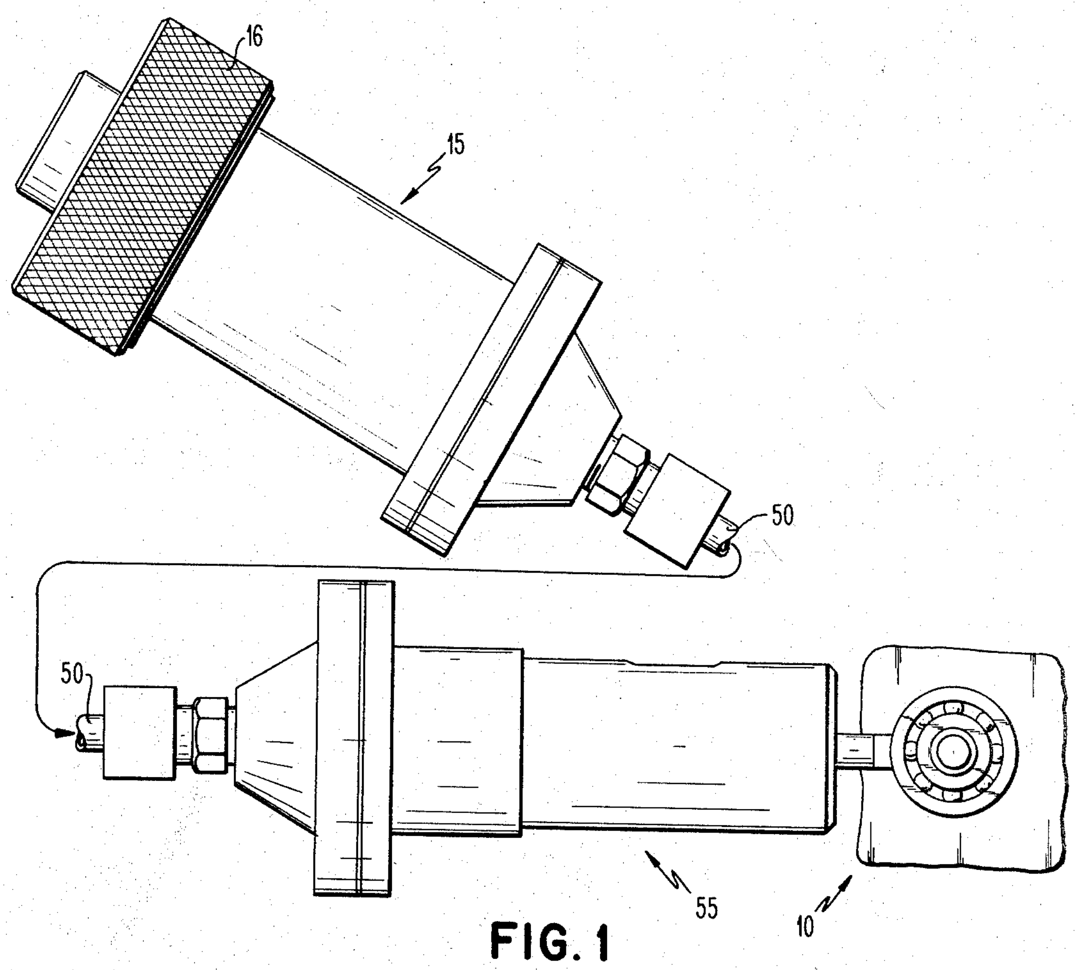
FIG. 1 is a fragmentary schematic perspective view of apparatus constructed in accordance with the present invention.

Referring now to the drawings, and more particularly FIG. 1, apparatus is illustrated therein for effecting changes in the position of a workpiece 10. As illustrated the apparatus includes a transmitter or control unit 15 which is connected by way of conduit or tubing 50 to a receiver or manipulator 55. The transmitter 15 may be remotely positioned relative to the receiver, or may be directly connected, as desired. It should be recognized that the transmitter and receiver are connected hydraulically through the conduit 50. However, the transmitter is operated through drive means, in the present instance a control ring 16, to effect both large and small changes in position of the workpiece 10.

In order to effect change of position of the workpiece 10 by movement of the control ring 16, the transmitter 15 is hydraulically connected to the receiver 55 and follows both rough and fine adjustment due to rotation of the ring. To this end, and referring to FIG. 3, the transmitter comprises a tubular housing 17 including a bore 17A, the housing including a chamber 18 in which is mounted means, in the illustrated instance a primary piston 19, to effect changes in the volume of the chamber 18. In order to effect small changes in the volume of the chamber 18, a secondary piston 20 is mounted coaxially in the first piston 19. The first piston 19 is slidably positioned in the chamber 18, and is connected to a rolling diaphragm 21 so as to prevent fluid in the chamber from communicating with the rearward portion or bore 17A of the tubular housing 17. As shown, the chamber 18 communicates through a nipple 22 with the conduit 50.

Figures 3, 4, 5:
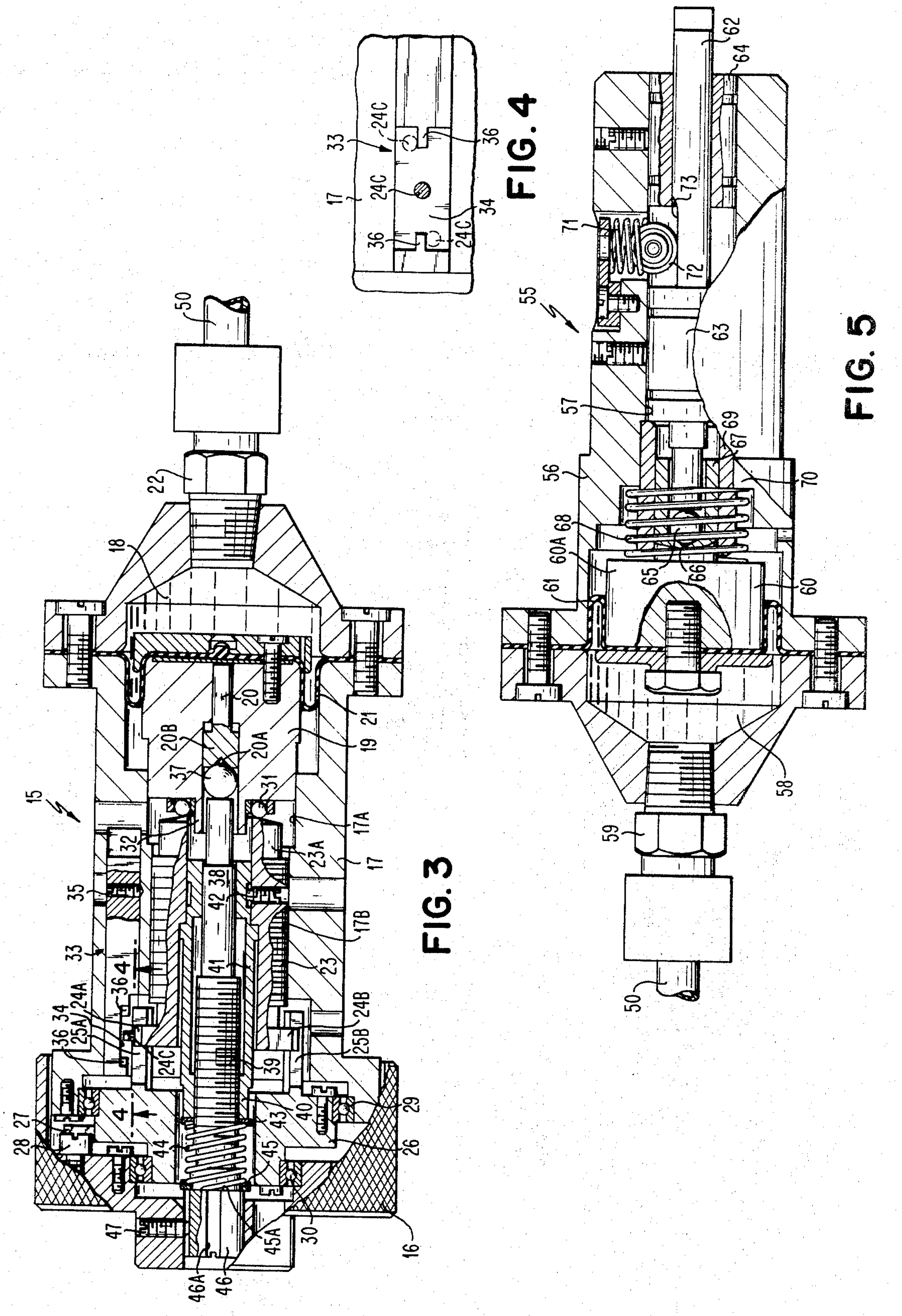
FIG. 3 is an enlarged fragmentary sectional view of a portion of the apparatus illustrated in FIG. 1.
FIG. 4 is a fragmentary sectional view taken along line 4—4 of FIG. 3 and as if FIG. 3 were not in section.
FIG. 5 is an enlarged fragmentary sectional view of another portion of the apparatus illustrated in FIG. 1.

In order to effect volumetric changes in the chamber, which will, of course, force liquid in the chamber through the conduit 50 to the receiver 55, means are provided coupling the first piston 19 to the control ring 16 whereby upon actuation of the ring, by rotation in the illustrated instance, the piston 19 will reciprocate in the bore 17A of the tubular housing. To this end the piston 19 is coupled through an externally threaded sleeve 23 to a rotatable ring-shaped coarse driver 26, the coarse driver having a radially projecting tang 27 which cooperates with a limit stop or the like, in the present instance a screw 28, whereby upon rotation of the control ring 16 and abutment of the stop 28 against the tang, rotation of the coarse driver 26 is effected. As will become evident hereinafter, the limit stop 28 acts as a lost motion device in conjunction with the tang 27 such that a 36° rotation of the control ring may be effected before imparting motion to the tang. As shown in FIG. 3, the coarse driver 26 is connected as by a bearing 29 to the tubular housing 17 and by a second bearing 30 to the control ring 16 so that the control ring may rotate independently of rotation of the coarse driver. In order that rotation of the coarse driver 26 effects axial reciprocation of the sleeve 23 by advancement of the threads of the sleeve in the threads of the housing in the bore portion 17B, the sleeve 23 includes at least one, in the present instance, a pair of radial projections 24A, 24B, which cooperate with axially extending, bifurcated drive elements 25A, 25B extending from the coarse driver 26. In this manner, as the coarse driver is rotated, the bifurcated drive elements 25A, 25B housing the projections 24A, 24B respectively in the bifurcation, effects rotation of the sleeve 23 while allowing axial movement of the projections due to the bifurcations. To permit rotation of the threaded sleeve while affecting axial movement of the piston 19, and to minimize wear, the forward end 23A of the sleeve 23 abuts a thrust bearing 31 seated on a collar 32 connected to the after end of the piston 19.

In order to limit the axial motion of the piston 19 in the chamber 18, coarse limit stop means are provided. To this end and referring to FIGS. 3 and 4, the limit stop means comprises, in the present instance, a key 33 having a radial recessed portion 34 which provides clearance for a tit 24C which projects radially from one end of at least one of the projections 24A, 24B. As shown in FIG. 3, the key is connected to the housing 17 as by a screw 35. As illustrated in FIG. 4, the recessed portion 34 includes inwardly tapered projecting abutments 36 which limit axial movement of the threaded sleeve 23 upon the tit 24C coming into contact with the abutments.

In order to effect fine changes in the volume of the chamber 18, the secondary piston 20, heretofore alluded to, is also driven by the control ring 16. To this end, the piston 20 is connected through a self-aligning ball 37 seated in a socket 20A at the rear portion 20B of the piston 20. Projecting into the collar 32 is an axially extending shaft 38 having a threaded portion 39 which cooperates with an internally threaded portion 40 of an inner sleeve 41. The inner sleeve 41 is connected to the concentrically mounted threaded sleeve 23 as by a screw 42. A flange 43 mounted on the sleeve, circumscribes the threaded portion 39 of the shaft 38, and is engaged by a spring 44 which abuts an axially spaced flange 45, which engages a shoulder 45A of a slotted head shaft driver 46. The spring 44 serves to bias the shaft 38 against the ball 37 and thus the piston 20. In turn the shaft driver head 46 is connected as by a set screw 47 to the control ring 16 whereby upon rotation of the control ring axial movement of the shaft is affected by way of the threaded portion 39 and internally threaded sleeve 41. As the control ring is rotated, as heretofor described, the stop 28 will allow one complete rotation of the control ring prior to engaging the tang 27. This single rotation is sufficient to cause a displacement of the secondary piston 20 a minute amount sufficient to cause a volumetric change in the liquid in the chamber 18. In this manner small changes of volumetric displacement occur.

It should be recognized that the slotted head shaft driver 46 includes circumferentially spaced, axially extending slots 46A for receiving the set screw 47, the slots permitting free axial movement of the shaft 38, but necessitating rotation with the control ring 16. Additionally, inasmuch as the sleeve 23 is connected via the screw 42 to the inner sleeve 41, rotation of the control ring 16, after engagement of the tang 27 by the stop 28, causes axial movement of the shaft 38 by the axial movement of the sleeve 23. Thus the secondary piston 20 is carried with coarse movement of the piston 19 as well as being independently movable.

In order to follow volumetric changes in the chamber 18, and translate these changes to an output for effecting the position of a workpiece 10, the receiver 55 has means for changing a hydraulic input to a mechanical output. To this end, the receiver 55 includes a tubular housing 56 having a bore 57 which merges into a chamber 58, the chamber being connected as by a nipple 59 to the conduit 50. Mounted in the chamber 58 is a piston 60 including a rolling diaphragm 61 which divides the chamber so as to prevent fluid entry rearwardly of the piston 20 into the bore 57 while permitting axial movement of the piston. Slidably mounted in the bore 57 is output means, in the illustrated instance an axially extending shaft 62 slidably disposed in ball bushings 63 and 64. One end of the shaft abuts a ball 65 positioned in a socket 66 in a collar 67 connected to the piston 60. In this manner, movement of the piston 60 is translated into an axial movement of the shaft 62 providing an output for moving or adjusting the position of the workpiece.

In order to bring the output shaft 62 to an initial or home position, upon rotation of the control ring 16 associated with the transmitter 15, and backing off of the threaded sleeve 23 and thus piston 19 moving to the left (FIG. 3), biasing means are provided against the piston 60 to cause fluid displacement through the conduit 50 back into the chamber 18. To this end a spring 68 abuts the rearward end 60A of the piston 60 circumscribing the collar 67 and auxiliary guide sleeve 69. The opposite end of the spring abuts a circumferentially extending ledge 70 in the housing 56 of the receiver 55 thereby tending to cause displacement of the piston 60 back in the chamber 58 upon release of pressure upon the first piston 19 of the transmitter 15.

In order to prevent inadvertent lateral movement of the output shaft 62 in the ball bushings 63 and 64, biasing means are positioned in the housing 56 for radial engagement with shaft 62. To this end, and as illustrated in FIG. 5, a spring 71 biases a bearing 72 against a recessed or flat portion 73 of the shaft 62, the bearing 72 permitting axial movement of the shaft while inhibiting radial displacement thereof.

The manipulating apparatus of the present invention is useful for making small changes in the position of workpieces. Such apparatus is useful, for example, for changing the X, Y, and $\theta$ (polar) coordinates of a system such as disclosed in U. S. Pat. No. 3,466,514 issued to Brunner et al on Sept. 9, 1969. The apparatus is also useful in conjunction with apparatus such as that disclosed in the copending application of Cachon et al, "Alignment Mechanism", Ser. No. 24,257 filed contemporaneously herewith. The system that it is useful with is illustrated in the copending U. S. patent application to Ernst Schmid "Apparatus for Aligning Photo Masks with Semi-Conductive Wafers", Ser. No 24259 filed contemporaneously herewith.

Figure 2:
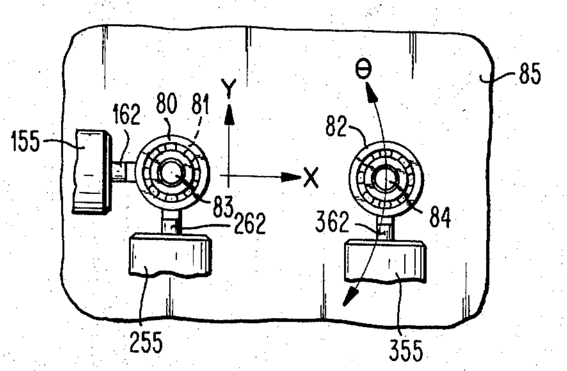
FIG. 2 is a fragmentary schematic view of a typical way in which the apparatus of the present invention may be utilized.

For example, and referring to FIG. 2, receivers 155, 255, and 355 (identical to that heretofore described) may be connected through output shafts 162, 262, and 362 to ball bearings 80, 81, and 82 respectively. The inner races of bearings 80 and 81 are connected to a post 83 while the inner race of bearing 82 is connected to a second post 84, the posts being attached to a stage or base 85. Upon change of position of the output shaft 162 the stage will be displaced in the horizontal or X-plane, while displacement of the output shaft 262 will cause a vertical or Y coordinate displacement of the stage 85. Additionally, if the output shaft 362 is caused to be displaced as by the receiver 355, rotation of the stage 85 about the post 83 is effected and as the stage or base 85 is connected to a workpiece, such as a semiconductor wafer, accurate positioning of the workpiece will be effected.

Thus the apparatus of the present invention permits making fine and coarse adjustments of a workpiece without the inherent disadvantages relative to an all mechanical system.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. Apparatus for effecting changes in the position of a workpiece, said apparatus comprising a transmitter and a receiver; a housing for said transmitter and a housing for said receiver; a chamber in said transmitter housing and a chamber in said receiver housing; conduit means connecting said chambers; primary and secondary piston means slidably mounted in said chamber of said transmitter; means to effect movement of said primary piston means and means to effect movement of said secondary piston means to change the volume of said chamber; and lost motion means comprising means to effect simultaneous movement of said primary and secondary piston means after a predetermined independent movement of said secondary piston means; and piston means slidably mounted in said chamber of said receiver; separate means connected to each of said piston means so that a liquid may be held in said chambers and conduit intermediate said piston means; said piston means in said receiver chamber being responsive to changes in volume in the transmitter chamber when said chambers and conduit are filled with a liquid; shaft means connected to said piston means in said receiver, and biasing means engaging at least one of the piston means in one of said housings so that increases in the volume of the chamber in the transmitter housing are reflected by a decrease in the volume of the chamber in the receiver.

2. Apparatus in accordance with claim 1 wherein said secondary piston means has a smaller diameter than the diameter of said primary piston means in said transmitter chamber.

3. Apparatus in accordance with claim 1 wherein said means for effecting movement of said primary piston means comprises an axially slidable element bearing against one end of said primary piston means, said element comprising an externally threaded sleeve, and thread means in said housing coupling said sleeve; means for effecting axial movement of said element to cause axial movement of said primary piston means in said chamber thereby changing the volume of said chamber, said means including driver means rotatably mounted in said housing and coupled to said sleeve to effect rotation thereof; and stop means limiting the axial motion of said element.

4. Apparatus in accordance with claim 3 wherein said separate means connecting said piston means for liquid retention in said chambers comprises separate rolling diaphragms connected to said piston means and said housings.

5. Apparatus in accordance with claim 3 including at least one axially extending bifurcated drive element connected to said driver means; a radially extending projection connected to said sleeve embraced by said bifurcated drive element.

6. Apparatus in accordance with claim 3 wherein said means for actuating said secondary piston means comprises a shaft extending longitudinally of said housing; and control means coupled to said shaft to provide axial reciprocation thereof.

7. Apparatus in accordance with claim 6 including ball means intermediate said shaft and said secondary piston means.

8. Apparatus in accordance with claim 3 wherein said actuating means for said secondary piston means comprises shaft means and second sleeve means, said shaft and second sleeve means being concentrically mounted with respect to said externally threaded sleeve; externally threaded means on said shaft means and internally threaded means on said second sleeve means cooperating with the threaded means on said shaft, and control means for rotating said shaft, and means to permit axial movement of said shaft with respect to said control means as said control means imparts rotary movement to said shaft means.

9. Apparatus in accordance with claim 8 including means connecting said externally threaded sleeve to said internally threaded second sleeve whereby upon rotation of said externally threaded sleeve axial motion is applied to said shaft.

10. Apparatus in accordance with claim 8 including at least one axially extending bifurcated drive element connected to said driver means; a radially extending projection connected to said sleeve and embraced by said bifurcated drive element.

11. Apparatus in accordance with claim 3 wherein said shaft means connected to said piston includes means in said housing engageable with said shaft for permitting axial movement of said shaft, but inhibiting radial movement thereof.

12. Apparatus in accordance with claim 11 including biasing means urging said piston in said chamber of said receiver towards said pressure conducting means.

* * * * *